Jan. 28, 1936.  L. SEGAR  2,029,199

HANDLE

Filed April 23, 1935

*Lee Segar*

INVENTOR

BY *Victor J. Evans & Co.*

ATTORNEYS

Patented Jan. 28, 1936

2,029,199

UNITED STATES PATENT OFFICE 2,029,199

HANDLE

Lee Segar, Troy, Pa.

Application April 23, 1935, Serial No. 17,885

3 Claims. (Cl. 292—173)

The invention relates to a handle construction and more especially to latch handles having stream line effect.

The primary object of the invention is the provision of a handle of this character, wherein the same is counterseated within a releasing plate, both having stream lines and such handle can be easily and conveniently operated for controlling the latching bolt of a lock and is adaptable to doors, hub caps or other releasable parts, particularly equipment for an automobile or other vehicle.

Another object of the invention is the provision of a handle of this character, wherein the releasing plate which initially projects the handle from the counterseat in said plate assures easy grasping of the handle for the operation thereof when it is desired to unlatch a part and the external configuration of said handle and releasing plate is such as to give ornamental and artistic effect to the article with which said handle is associated, the counterseating of the handle eliminates undue projecting thereof when the part is latched with which the handle is in association and avoiding damage to the latter.

A further object of the invention is the provision of a handle of this character, which is simple in its construction, thoroughly reliable and efficient in its operation, neat and attractive in appearance having stream line conformation, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
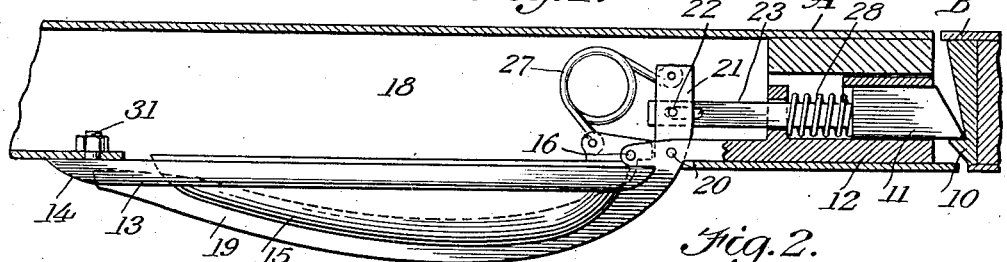
Figure 1 is a fragmentary horizontal sectional view through a swinging door showing the handle constructed in accordance with the invention applied thereto.
Figure 2:
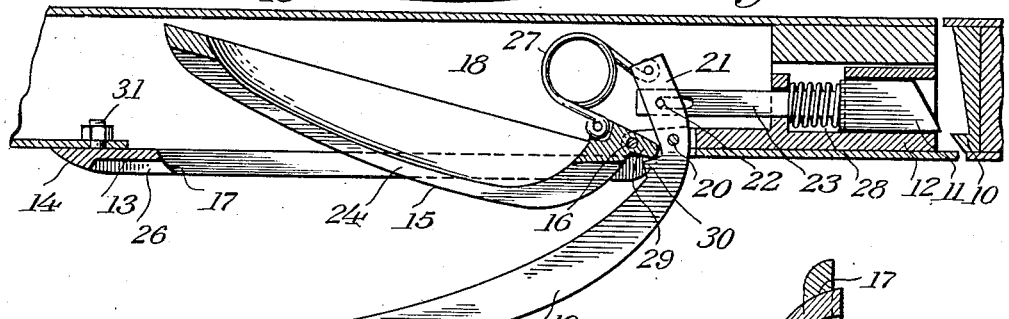
Figure 2 is a view similar to Figure 1 showing the handle released for manipulation thereof.
Figure 5:
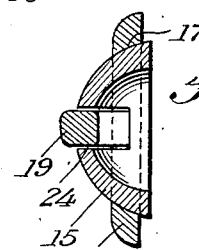
Figure 5 is a vertical transverse sectional view.
Figure 3:
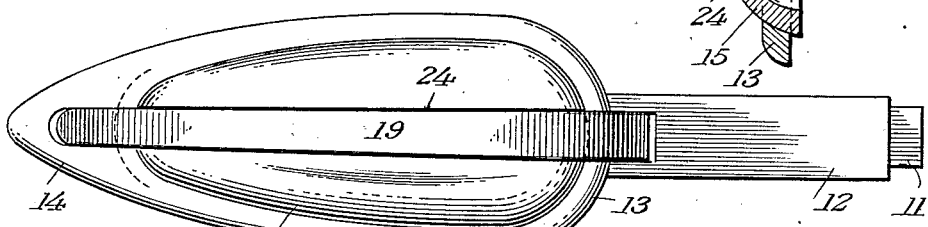
Figure 3 is a front elevation of the handle.
Figure 4:
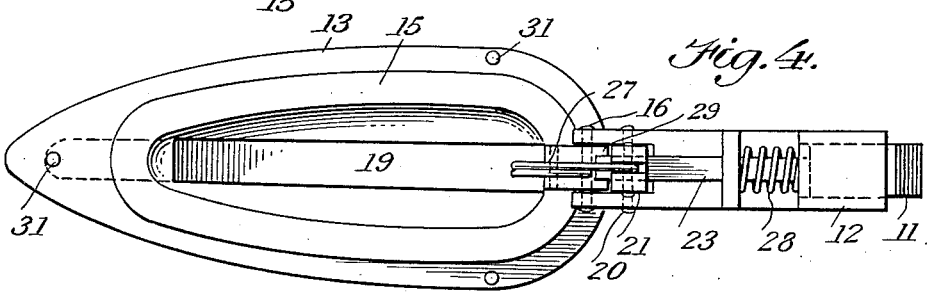
Figure 4 is a rear elevation thereof.

Referring to the drawing in detail, A designates generally a portion of a swinging door which is of any conventional type, in this instance being representative of an automobile door and B a portion of the keeper side of a door frame, it having a latch keeper 10 for engagement with a bolt 11 of the sliding trip type. The bolt is slidably fitted in a guide 12, in this instance it being a part of a handle base or a door mounting 13 for the handle constituting the present invention and hereinafter fully described.

The mounting 13 is in the form of an open frame and of cigar shape having a rounded or curvilinear outer surface 14 to present stream line formation.

Fitted with the mounting 13 is an outwardly bulged substantially oval shaped releasing plate 15 supported upon a pivot 16 fitting the mounting 13 so that the plate can swing from a seat 17 provided in the mounting 13 and inwardly into a space 18 constituted by the build of the door A. The pivot 16 for the plate 15 is at the end next to the bolt 11 while next to this pivoted end of the plate 15 is the bolt operating handle 19, it being swingingly supported upon a pivot 20 carried by the mounting 13 and the inner end 21 of this handle has loose pivotal connection 22 with a stem 23 of the bolt 11 so that the said bolt when the door A is pushed closed will trip the keeper 10 for latching engagement therewith. On operating the handle 19 by pulling outwardly upon the same the bolt 11 can be retracted to disengage from the keeper 10 and thus unlatch the door. This handle 19 is of a conformation having stream line effect and is adapted to be accommodated in a counterseat or channel 24 provided in the releasing plate 15 when the latter is in the seat 17 and the handle has moved inwardly with relation to the door A. This counterseat or channel 24 extends longitudinally at the center of the plate 15 throughout the length thereof so that the handle 19 will be counterseated in the plate when these parts are in normal position and particularly when the bolt 11 is latched with the keeper 10 for the fastening of the door A closed in the door frame B.

The handle 19 is of slightly greater length than the plate 15 and its free end 25 is accommodated within a notch 26 therefor provided in the mounting 13.

Loosely connected with the plate 15 and the inner end 21 of the handle 19 adjacent to the pivots for these parts is a coiled compression spring 27 which functions to move the said plate 15 into the seat 17 and the handle 19 in the counterseat 24 in this plate which is the normal relationship thereof.

The steam 23 of the bolt 11 has about the same a coiled expansion spring 28 it operating upon the bolt to throw the same to latching position.

The releasing plate 15 at its pivoted end has a kicking nib 29 for cooperation with a shoulder 30 provided on the handle 19 close to the pivot 20 therefor, the purpose of the nib 29 being to operate upon the shoulder 30 when pressure is applied to the plate 15 so that the handle 19 will be initially moved outwardly for free grasping thereof so that it can be conveniently operated to control the bolt 11 for the disengagement thereof with the keeper 10. The mounting 13 is preferably made secure upon the door A by fasteners 31, the door being cut away at the proper locality to provide a clearance for the plate 15 in the movement thereof with relation to the mounting 13 for the handle.

It should be understood that this handle 19 and the adjuncts thereof are adaptable for service with a hub cap or other parts releasably latched in a set position and in the service of the handle it presents stream line conformation in association with such parts.

Further, it is to be understood that the invention is not limited as to shape, arrangement of parts excepting the relationship of the handle and the releasing plate as changes, variations and modifications may be made in the structure as fall properly within the scope of the appended claims and without departing from the spirit of the invention.

What is claimed is:

1. The combination of a latch releasing handle, a releasing plate having the handle interfitted therewith and operative for projecting the handle when pressure is applied to said plate, means connected with the handle and plate to normally hold the same interfitted with each other and latching means directly operated upon by the handle when projected by the plate and said handle shifted in one direction.

2. The combination of a latch releasing handle, a releasing plate having the handle interfitted therewith and operative for projecting the handle when pressure is applied to said plate, means connected with the handle and plate to normally hold the same interfitted with each other, latching means directly operated upon by the handle when projected by the plate and said handle shifted in one direction and a mounting for pivotally supporting the plate and the said handle.

3. The combination of a latch releasing handle, a releasing plate having the handle interfitted therewith and operative for projecting the handle when pressure is applied to said plate, means connected with the handle and plate to normally hold the same interfitted with each other, latching means directly operated upon by the handle when projected by the plate and said handle shifted in one direction, a mounting for pivotally supporting the plate and the said handle and a striker nib on the plate and active upon the handle for effecting the initial projecting thereof upon pressure on the plate.

LEE SEGAR.